Patented Feb. 20, 1940

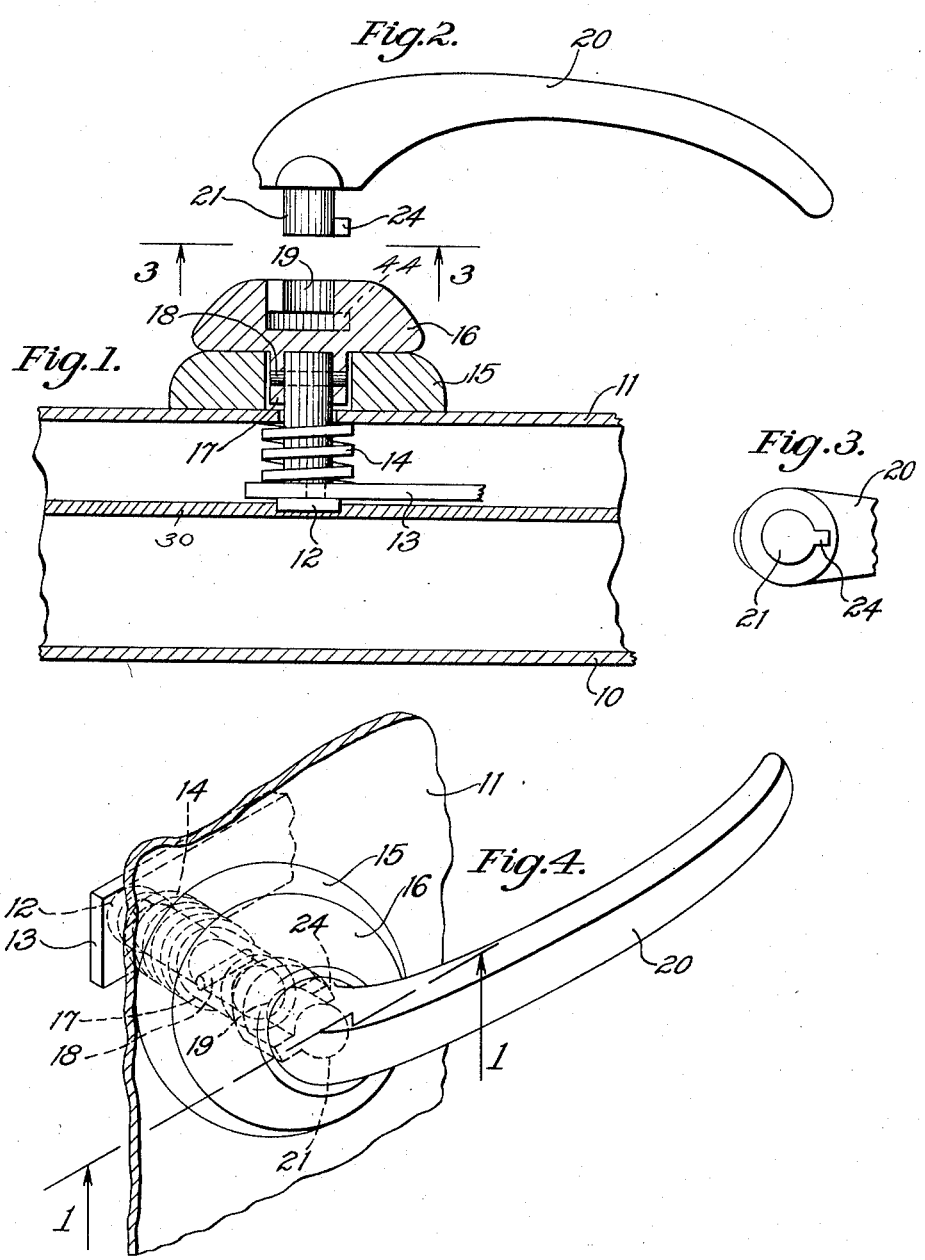

2,190,951

UNITED STATES PATENT OFFICE 2,190,951

AUTOMOBILE DOOR HANDLE

Martin J. Roach, Brighton, Mass.

Application February 23, 1938, Serial No. 191,929

2 Claims. (Cl. 292—348)

This invention relates to handles for automobile doors and consists in a smooth rounded socket member which is connected to the door latching mechanism and which itself offers no grip to the occupant of the car but is adapted to receive an operating lever under proper conditions.

One object of the invention is to prevent unauthorized or inadvertent opening of an automobile door by providing a handle which can be easily rendered inoperable. Felonious entries to automobiles are often effected by operating an inside door handle with a stiff wire hook or other implement, and serious accidents frequently occur when children play with door handles and unlatch the doors. The latter possibility deters purchasers from buying automobiles provided with separate doors for the rear seating compartments.

As herein shown the safety handle of my invention includes in its structure a circular rounded head fitted over the spindle conventionally provided as part of the latching mechanism in automobile doors and a curved lever having an integral projection dimensioned to fit into a socket provided in the exposed face of the head. The lever may be removed and kept in another part of the automobile and used as a key when it is desired to open the door from the inside of the automobile. Means for locking the curved lever to the head is also contemplated in order that the lever may be used to swing the door to and fro when desired.

An important advantage of the handle of my invention resides in the fact that its construction makes it possible for handles furnished by automobile manufacturers to be replaced without a change or adaptation of any of the fittings. Moreover its design is such as to avoid sharp edges which might tear clothing or scratch the occupants of the car.

These and other features and objects of the invention will be best understood and appreciated from the following description of a preferred embodiment thereof, selected for purposes of illustration and shown in the accompanying drawing, in which:

Fig. 1 is a view in cross section showing a handle according to the invention assembled on an automobile door, Fig. 2 is a view in side elevation of the locking lever, Fig. 3 is a view from beneath the lever, taken along line 2—2 of Fig. 1, and Fig. 4 is a view in perspective.

As shown in the drawing, the handle of my invention is secured to a spindle disposed horizontally in an automobile door and extending through the inner sheathing of upholstery. The conventional elements of the automobile door include an outer metal wall 10, an inner panel 11 of upholstery or leather and a truss 30. A horizontal spindle 12 is connected to a link 13 leading to the latching mechanism (not shown) and extends inwardly through an orifice in the panel 11. The outer end of the spindle 12 bears against the truss 30. Carried on the spindle 12 between the link 13 and the panel 11 is a helical compression spring 14 normally urging the inner panel 11 inwardly. (It is to be understood that the terms "inwardly" and "outwardly" are used in relation to the automobile.) A rounded metal washer 15 surrounds the inner end of the spindle 12 and rests against the inner surface of the panel 11. A rounded metal head 16 provided with an integral sleeve 17 and a socket 19 in its inner surface is rigidly secured to the spindle 12 by a locking pin 18 which extends through the sleeve 17 and a hole in the spindle 12. The washer 15 covers the sleeve 17 and prevents the pin 18 from falling out. In assembling the head 16 on the spindle 12 the washer 15 is pressed outwardly against the action of the spring 14 until the hole in the spindle 12 is exposed; it is then possible to insert the locking pin 18 into place. Removal of the head 16 is similarly made possible.

A curved, actuating lever, or key 20, is provided with a spindle 21 having an integral lug 24 projecting therefrom. The lever 20 may be fitted into the head 16 by placing the lug 24 in register with a key-way cut into the side of the socket 19. The bottom of the key-way intersects an arcuate slot 44 extending around one quarter of the socket 19. After the lug 24 and the spindle 21 have been inserted in the key-way and the socket 19 respectively, the lever 20 may be rotated until the lug 24 abuts against one end of the arcuate slot 44, and further rotation of the lever 20 causes the head 16 and the spindle 12 to turn and actuate the link 13 connected to the latching mechanism. While the lug 24 is confined within the arcuate slot at the bottom of the socket 19, the lever 20 cannot be pulled out, and it may be used to swing the door to and fro as desired. It is to be understood that any conventional locking means may be used to secure the lever 20 to the head 16 and that the arrangement of the lug 24 with a key-way and slot in the socket 19 is illustrative only.

While it is theoretically possible to actuate the latching mechanism by turning the head 16, it is practically impossible to do so, since it presents a smooth rounded surface and so affords no grip.

It will now be apparent that I have provided a safety door handle which effectively prevents unauthorized opening of an automobile door by actuation of the inside handle from the outside and which also prevents injury to children by making it impossible for them to open the door when the handle is removed. It should be understood that my invention is not limited to automobile doors but may profitably be used on any type of door where a permanent handle is undesirable.

Having thus described my invention, what I claim as new and desire to secure by Letters Patent of the United States is:

1. In a vehicle door including an inner panel of upholstery and a truss, a spindle bearing against the truss and operating a latching mechanism, a spring on said spindle urging said panel inwardly, a head having a socket therein, a sleeve integral with said head and surrounding said spindle, a locking pin extending through said sleeve and said spindle, a washer surrounding and concealing said sleeve and pin, and a lever provided with an integral projection for engagement with said socket.

2. The structure set forth in claim 1 wherein said socket is provided with a keyway and an arcuate slot, and including a lip integral with the projection on the lever for engagement in said keyway and slot.

MARTIN J. ROACH.